United States Patent [19]

Miyaura

[11] Patent Number: 5,699,874
[45] Date of Patent: Dec. 23, 1997

[54] ELECTRIC POWER STEERING APPARATUS

[75] Inventor: Yasuhiko Miyaura, Gunma, Japan

[73] Assignee: NSK Ltd., Tokyo, Japan

[21] Appl. No.: 592,836

[22] Filed: Dec. 29, 1995

[30] Foreign Application Priority Data

Jan. 11, 1995 [JP] Japan ................... 7-018409

[51] Int. Cl.$^6$ ................... B62D 5/04
[52] U.S. Cl. ................... 180/443; 180/444
[58] Field of Search ................... 180/407, 443, 180/444; 439/34; 364/424.051, 424.053

[56] References Cited

U.S. PATENT DOCUMENTS 5,086,870  2/1992  Bolduc ................... 180/336 X
5,569,991  10/1996  Matsuoka et al. ................... 180/446 X

FOREIGN PATENT DOCUMENTS

63-146736  9/1988  Japan ................... G01L 5/22
63-232073  9/1988  Japan ................... B62D 5/04

Primary Examiner—Victor E. Johnson
Attorney, Agent, or Firm—Sughrue, Mion, Zinn, Macpeak & Seas, PLLC

[57] ABSTRACT

In an electric power steering apparatus including a steering torque detector for detecting steering torque of a steering system, an electric motor for generating steering auxiliary force with respect to the steering system, and a control apparatus for controlling the steering auxiliary force generated by the electric motor in response to the torque detected by the steering torque detector, the electric power steering apparatus includes lines, at least one portion of which are arranged in parallel to each other, for electrically connecting the steering torque detector to the control apparatus; and a contact part having detachable contact portions separately inserted into the respective parallel portions of the lines.

3 Claims, 8 Drawing Sheets

ELECTRIC POWER STEERING APPARATUS

BACKGROUND OF THE INVENTION

The present invention relates to an electric power steering apparatus for applying steering auxiliary force generated by an electric motor to a steering system of a vehicle. More specifically, the present invention is directed to such an electric power steering apparatus capable of increasing reliability and operability by making either one portion, or an entire portion of an electric connecting unit in a dual system, which is connected between a steering torque detector and a control apparatus.

In a conventional electric power steering apparatus, a motor drive current is controlled based on a torque detection signal detected by a torque sensor and a vehicle speed detected by a vehicle speed sensor, this motor drive current is supplied to an electric motor, so that the steering force of a steering wheel is supported (see Japanese Patent Unexamined Publication No. Sho. 63-232073, and Japanese Utility Model Unexamined Publication No. Sho. 63-146736).

Figure 12:
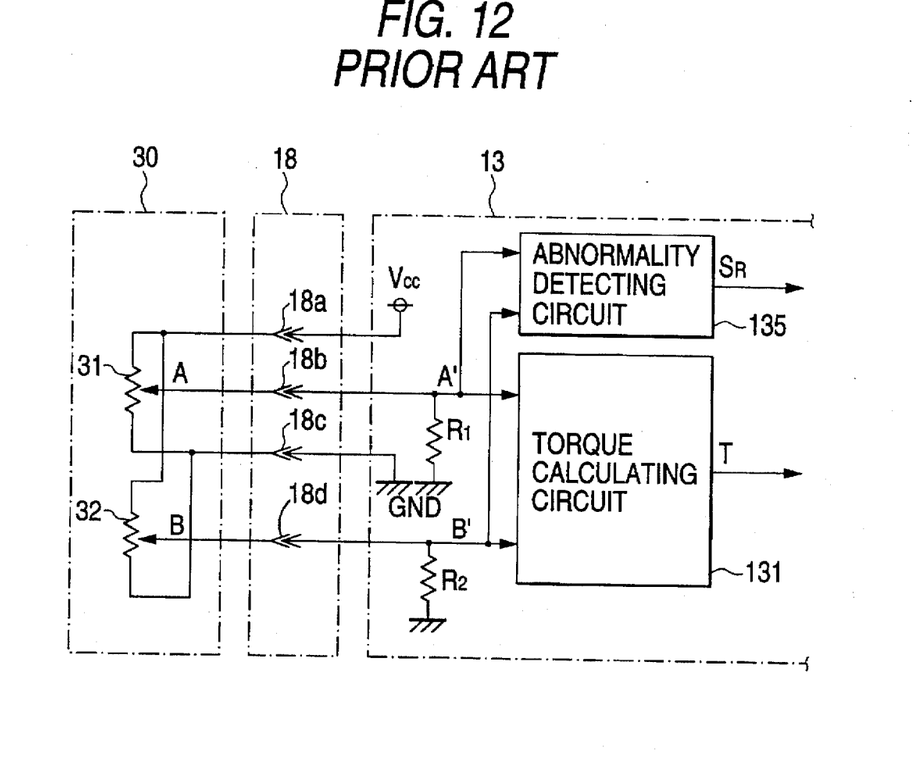
FIG. 12 is a block diagram for indicating the major portion of a conventional power steering apparatus.

In FIG. 12, there is shown a circuit portion where a torque sensor is major in such an electric power steering apparatus. In this drawing, reference numeral 30 indicates a torque sensor having two potentiometers, reference numeral 18 represents a connector for detachably connecting a cable between the torque sensor and a controller, and reference numeral 13 denotes a controller, in which only an input portion of a detection signal derived from the torque sensor is represented. As to each of the potentiometer 31 and 32 of the torque sensor 30, the rotor thereof is rotated in response to the steering torque entered into the steering shaft, and the power supply voltage (Vcc) and the ground voltage (GND) are applied to both of fixation terminals, so that detection voltages A and B are produced at variable contacts, respectively, in response to the steering torque. Then, these detection voltages A and B are entered via lines of a cable for electrically connecting the torque sensor 30 with the controller 13, and further via the connector 18 into the controller 13 as detection voltages A' and B', respectively. On the other hand, both of the power supply voltage (Vcc) and the ground voltage (GND) are similarly applied from the controller 13 via other lines of the same cable to the torque sensor 30.

The lines of the detection voltages A' and B' inputted into the controller 13 are grounded via input resistors R1 and R2 in view of noise resistance. Since the input resistors R1 and R2 have such high resistance value R2 that they give no adverse influences to the detection voltages A and B produced by the resistor voltage division, the detection voltages A' and B' are normally coincident with the detection voltages A and B. The detection voltages A' and B' are entered as the signal indicative of the detection torque into a torque calculating circuit 131 and an abnormality detecting circuit 135. The torque calculating circuit 131 calculates an average value of the detection voltages A' and B' or the like, produces a single torque detection signal T, and supplies this single torque detection signal to a post-staged circuit for controlling a motor drive current. Also, the abnormality detecting circuit 135 calculates, for instance, a difference between the detection voltages A' and B', produces an abnormality detection signal $S_R$ when this difference exceeds a predetermined threshold value, and supplies this abnormality detection signal to a post-staged circuit for stopping the output of the motor drive current.

As described above, since the circuit portions from the potentiometers in the torque sensor up to the input stage circuit in the controller are made of a dual system, the average calculation can be performed. Then, reliability of the torque detection signals is increased, and the fail-safe function in response to the detection of the abnormality related to the torque sensor can be realized. As a consequence, reliability of the overall apparatus can also be increased.

However, even when reliability of the apparatus could be increased by making the torque detection system such as the torque sensor as the dual system, 100% reliability could not be achieved. As to the fail-safe function, although such reliability could be maintained in the meaning that the system would not be brought into the worst condition, the working efficiency under the optimum condition could not be always improved. For instance, when a loose contact happens to occur in the contact unit of the connector for connecting the steering torque detector with the control apparatus, there is such a problem that although no abnormality occurs in the torque sensor itself, either the generation of the steering auxiliary force is stopped, or the unnecessary steering auxiliary force is generated due to the fail-safe function. This connector is required to couple the steering torque detector with the control apparatus after they were separately manufactured. In such a connector, the detected voltage value of the steering torque is not so large, and since the input resistance is large, the detected current is very small. Under such circumstances, the electric loose contact would relatively often occur in the contact unit.

Figure 13:
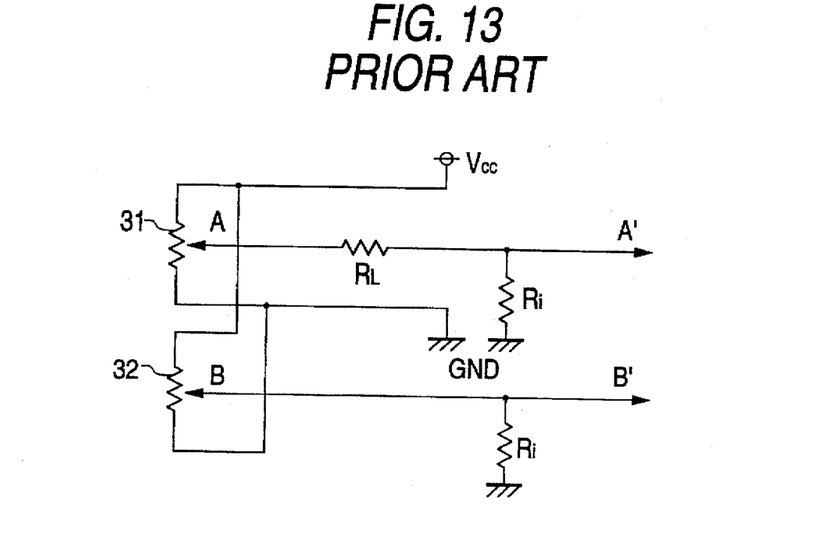
FIG. 13 is an equivalent circuit when the contact failure occurs in the conventional power steering apparatus.

The disadvantage in such a case will now be explained as concrete examples. As one concrete example, the following case will be explained: a contact portion 18b of the connector 18 employed in the above-described electric power steering apparatus is brought into the loose contact, or contact failure condition, and this contact portion 18b connects the lines of the detection voltage A and the detection voltage A'. It is assumed that another contact portion 18a inserted/connected into the power supply line, another contact portion 18c inserted/connected into the ground line, and another contact portion 18d inserted/connected into the lines of the detection voltages B and B' are operated under normal contact conditions and therefore are conducted. Assuming now that a value of a contact resistance in the contact portion 18b is "$R_L$", an equivalent circuit of this case is shown in FIG. 13. In this case, since the detection voltage B from the variable contact of the potentiometer 32 is directly under short-circuit condition to be set as the detection voltage B', the detection voltage B' is correctly made coincident with the detection voltage B. However, since the detection voltage A from the variable contact of the potentiometer 31 passes through the contact resistance ($R_L$) and thereafter is set as the detection voltage A', the detection voltage A' becomes $A(R_i/(R_L+R_i))$ by the resistor voltage division by way of the contact resistance ($R_L$) and the input resistance ($R_i$). In other words, the detection voltage A' is not coincident with the detection voltage A. As a consequence, when the value $R_L$ of the contact resistance is not so large, unwanted deviation may be produced, depending upon this value $R_L$, in the detection voltage A', the torque detection signal T, and further the steering auxiliary force produced by this value. When the value $R_L$ of the contact resistance becomes large, a difference between the detection voltage A' and the detection voltage B' becomes larger than a preselected threshold value, which may be detected as the abnormality. Then, the generation of the steering auxiliary force is stopped by the fail-safe function.

As described above, even when the torque detection system is designed to be the dual detection system, since the electric connection unit between the steering torque detector and the control apparatus is still made of the single system, there is another problem to be solved. That is, the optimum operation condition of the overall electric power steering apparatus would be deteriorated due to the contact failure, or loose contact.

On the other hand, since the electric power steering apparatus directly gives the influences to the steering performance of the vehicle, it is required that the occurring frequency of the above-explained problems should be lowered, and both of reliability and operability of the electric power steering apparatus could be further improved.

SUMMARY OF THE INVENTION

Therefore, the present invention has been made to solve the above-described problems of the prior art, and has an object to provide an electric power steering apparatus with higher reliability and higher operability by eliminating or reducing the disadvantage due to contact failures of an electric connection unit between a steering torque detector and a control apparatus.

To achieve the above-mentioned object, according to the present invention, in an electric power steering apparatus including a steering torque detector for detecting steering torque of a steering system, an electric motor for generating steering auxiliary force with respect to the steering system, and a control apparatus for controlling the steering auxiliary force generated by the electric motor in response to the torque detected by the steering torque detector, the electric power steering apparatus comprises: lines, at least one portions of which are arranged in parallel to each other, for electrically connecting the steering torque detector to the control apparatus; and a contact part having detachable contact portions separately inserted into the respective parallel portions of the lines.

In the electric power steering apparatus with such an arrangement according to the present invention, since the electric connection unit, namely the lines and the contact portions are made parallel, even when a loose contact happens to occur in some of the contact portions of the multiple system, if other contact portions in other systems are under normal condition, an electric current can be supplied via the normal contact portions. Thus, the relevant line arranged in the parallel form can function under normal condition unless all of the multiple systems are brought into the loose contact conditions. As the probability when all of the multiple systems are under loose contact conditions is lower than the probability when the contact failure happens to occur in a single system, there is higher probability that the detected torque can be transferred between the steering torque detector and the control apparatus under normal condition, which are connected by such a line. As a result, the efficiency at which the electric power steering apparatus for producing the steering auxiliary force in response to the detected torque is operated under optimum condition can be increased. In other words, reliability of the electric power steering apparatus and also the working efficiency thereof under optimum condition can be increased.

Accordingly, in accordance with the present invention, it is possible to provide such an electric power steering apparatus with high reliability and high working efficiency by making either a portion, or an entire portion of the electric connection unit connected between the steering torque detector and the control apparatus in the parallel form.

DETAILED DESCRIPTION OF THE INVENTION

Referring now to drawings, preferred embodiments of the present invention will be described.

Figure 1:
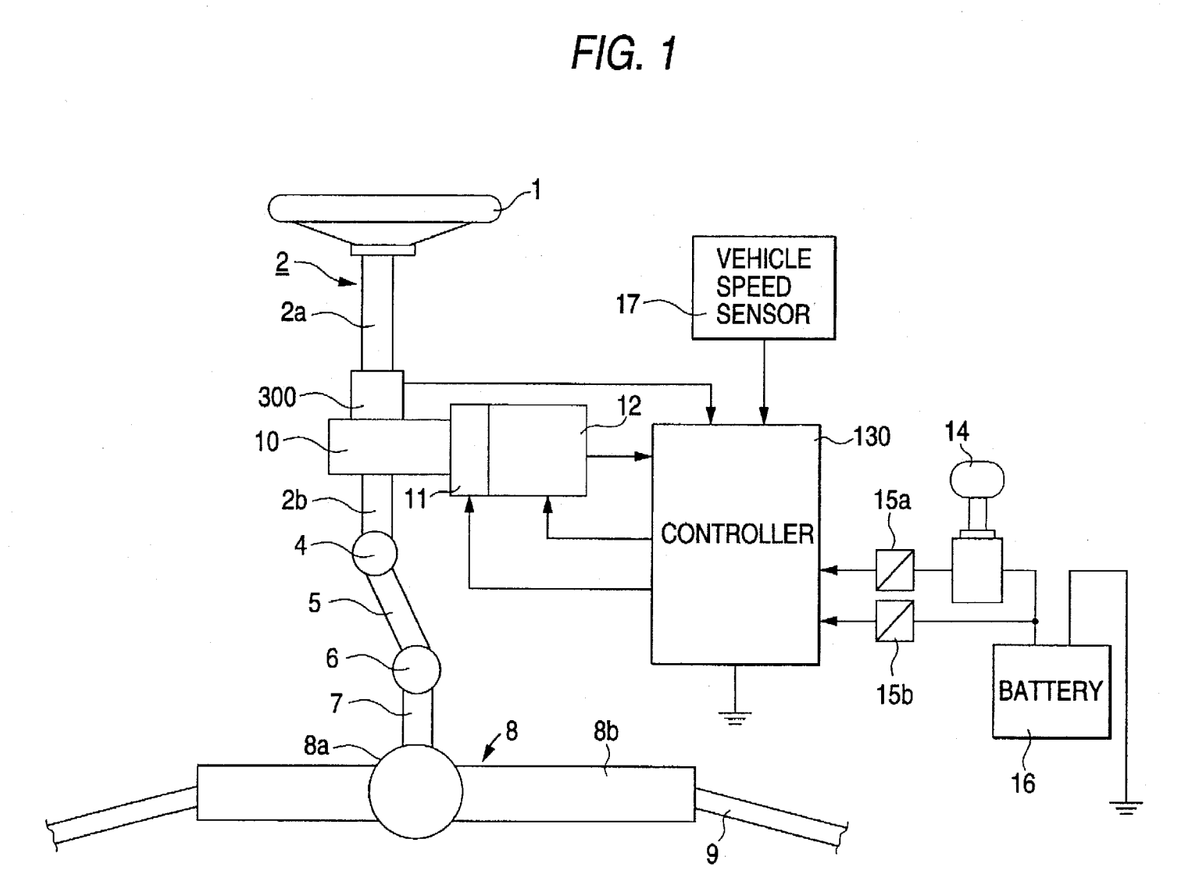
FIG. 1 is a schematic diagram for showing an arrangement of an electric power steering apparatus according to a first embodiment of the present invention.

FIG. 1 schematically represents an electric power steering apparatus according to a first embodiment of the present invention, especially a mechanical arrangement of a steering system thereof. In this drawing, reference numeral 1 designates a steering wheel. A steering force given to this steering wheel 1 is transferred to a steering shaft 2 made of an input shaft 2a and an output shaft 2b. One end of this input shaft 2a is coupled to the steering wheel 1, and the other end thereof is connected to one end of the output shaft 2b via a torque sensor 300 functioning as a steering torque detector. Then, the steering force transferred to the output shaft 2b is transferred via a universal joint 4 to a lower shaft 5, and furthermore is transferred via another universal joint 6 to a pinion shaft 7. Further, the steering force is transferred via a steering gear 8 to a tie rod 9, so that a steered wheel is steered. The steering gear 8 is constructed in a rack and pinion form having a pinion 8a and a rack 8b. The rotary movement transferred to the pinion 8a is converted to the linear movement by way of the rack 8b.

A reduction gear 10 for transferring a steering auxiliary force (assist force) to the output shaft 2b is coupled to the output shaft 2b of the steering shaft 2. To this reduction gear 10, an output shaft of a motor 12 functioning as the electric motor for producing the steering auxiliary force is coupled via an electromagnetic clutch apparatus 11 (referred to as a "clutch" hereinafter) for transferring/interrupting the steering auxiliary force. This clutch 11 is constructed of, for instance, an electromagnetic type clutch, whereas the motor 12 is constructed of, for example, a DC servo motor. Further, the clutch 11 includes a solenoid. To this solenoid, an energizing current is supplied from a controller 130 functioning as a control apparatus (will be discussed later) so that the reduction gear 10 is mechanically connected with the motor 12, and is disconnected by stopping the supply of the energizing current.

Figure 2:
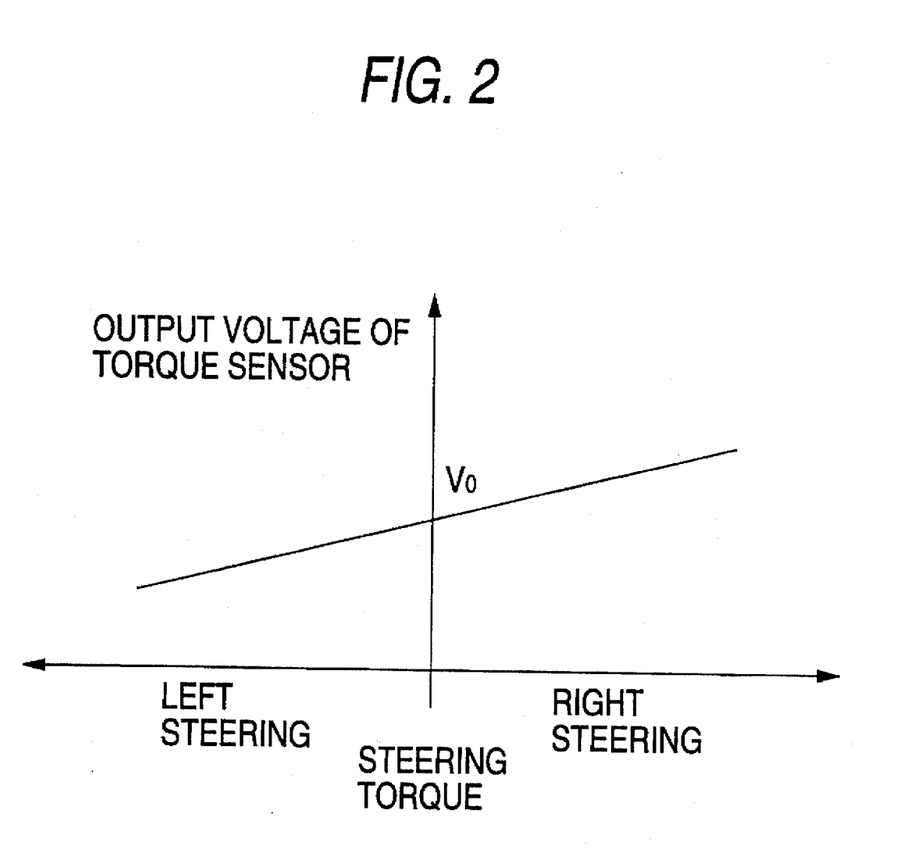
FIG. 2 is a characteristic diagram for representing a relationship between steering torque, and an output voltage of a torque sensor.

The torque sensor 300 is disposed at the steering wheel 1 so as to sense the steering torque transferred to the input shaft 2a. For instance, the torque sensor 300 is constructed such that the steering torque is converted into torsion angle deviation of a torsion bar interposed between the input shaft 2a and the output shaft 2b, and this torsion angle deviation is detected by a potentiometer. Then, when the steering wheel 1 is steered by a vehicle driver, the torque sensor 300 outputs a torque detection voltage of an analog voltage signal corresponding to a magnitude and a direction of torsion produced in the steering shaft 2. For example, as shown in FIG. 2, the torque sensor 300 is operated as follows. When the steering wheel 1 is located under neutral condition, the torque sensor 300 outputs a preselected neutral voltage Vo. When the steering wheel 1 is turned from this neutral position to the right direction, the torque sensor 300 outputs a voltage higher than the neutral voltage Vo in response to the steering torque at this time. When the steering wheel 1 is turned from this neutral position to the left direction, the torque sensor 300 outputs a voltage lower than the neutral voltage Vo in response to the steering torque at this time. It should be noted that as the neutral voltage Vo, a half value of the power supply voltage Vcc, namely Vcc/2 is selected, in general.

Reference numeral 130 represents a controller for controlling the drive operation of the motor 12 in order to control the steering auxiliary force applied to the steering system. The controller 130 is operated by power supply from a car battery 16. The negative polarity of the battery 16 is grounded, and the positive polarity thereof is connected via an ignition switch 14 for starting an engine of the vehicle and a fuse 15a to the controller 130, and also is directly connected via another fuse 15b to the controller 130. The voltage of the power supply applied via this fuse 15b is used to drive the motor 12, for example. The controller 130 controls the drive operation of the motor 12 based upon the torque detected from the torque sensor 300 and the vehicle speed detected from the vehicle speed sensor 17, and also turns ON/OFF the clutch 11 so as to bring the output shaft of the motor 12 and the reduction gear 10 into the coupling/disconnecting conditions.

Figure 3:
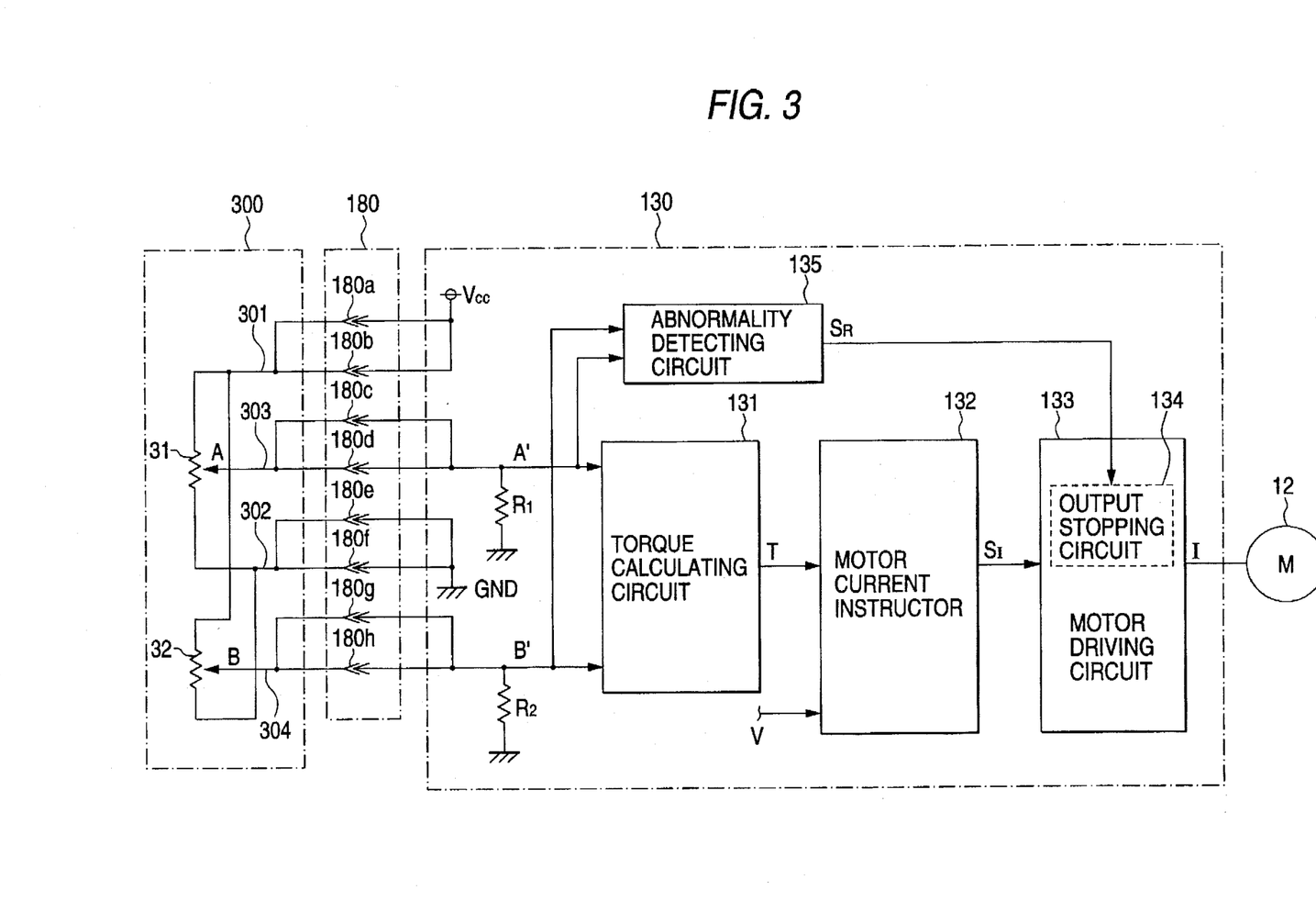
FIG. 3 is a block diagram for indicating a circuit arrangement for mainly showing a signal path for detecting torque.

FIG. 3 is a circuit block diagram for showing a circuit arrangement where the signal paths of the detected steering torque are mainly shown. This circuit arrangement is constructed of the torque sensor 300 functioning as the steering torque detector, a connector 180 functioning as the contact part, the controller 130 functioning as the control apparatus, and the motor 12 functioning as the electric motor.

The torque sensor 300 includes two potentiometers 31 and 32 in order that the torque detection system is made of the dual system. The potentiometer 31 among them is coupled to the torsion portion of the steering shaft 2 in such a manner that the rotator thereof is rotated in response to the steering torque entered into the steering wheel 1. One fixed terminal of the potentiometer 31 is connected to a line 301 of the power supply voltage (Vcc), the other fixed terminal thereof is connected to a line 302 of the ground voltage (GND), and a variable contact thereof is connected to an output line 303 of the detection voltage A. As a result, when the power supply voltage is applied between both of these fixed terminals, the detection voltage A is produced in correspondence with the steering torque.

On the other hand, the potentiometer 32 is similarly coupled to the steering shaft 2, for instance, at an axially symmetrical position with respect to the potentiometer 31 in such a manner that the rotator thereof is rotated in response to the steering torque entered into the steering wheel 1. One fixed terminal of this potentiometer 32 is connected to the line 301 of the power supply voltage (Vcc), the other fixed terminal thereof is connected to the line 302 of the ground voltage (GND), and a variable contact thereof is connected to an output line 304 of the detection voltage B. As a result, when the power supply voltage is applied between both of these fixed terminals, the detection voltage B is produced in correspondence with the steering torque. It should be understood that both of the potentiometer 31 and the potentiometer 32 have the same specifications, and thus the detection voltage A is in principle coincident with the detection voltage B.

Since such two potentiometers 31 and 32 are employed, the torque detecting system in the torque sensor 300 is made of the dual system. Then, in response to the steering toque entered into the steering shaft 1, one pair of detection voltages A and B which are similarly changed as shown in FIG.. 2 are obtained. The lines 301 and 302 are connected to the power supply line Vcc and the ground line GND of the controller 130 respectively. The lines 303 and 304 output the detection voltages A and B to the controller 130. Then, the detection voltages are externally derived by way of a cable or the like connected to the controller 130. It should be noted that the lines 301, 302, 303, 304 are branched to constitute two lines within the torque sensor 300, and the branched lines are externally derived. Accordingly, the lines 301, 302, 303 and 304 are made of the dual system in addition to the dual system of the torque detection system.

The connector 180 is constructed of a male portion and a female portion, which are detachable, and includes at least eight contact portions 180a to 180h, equipped with plug portions and jack portions which are made contact/conductive when these male/female portions are engaged with each other. In the contact portion 180a, for instance, the plug portion is connected to one of the branched lines of the line 301 and the jack portion is connected to the power supply line Vcc of the controller 130. In the contact portion 180b, the plug portion is connected to the other line of the branched lines of the line 301 and the jack portion is connected to the power supply line Vcc of the controller 130. As a consequence, with respect to the line 301 for electrically connecting the fixed terminal of one of the potentiometers 31 and 32 of the torque sensor 300 with the power supply line Vcc of the controller 130, the detachable contact portions 180a and 180b are separately inserted into the dual portions of the line.

Similarly, the contact portions 180c and 180d are inserted/connected into/to the respective branched lines of the line 303; the contact portions 180e and 180f are inserted/connected into/to the respective branched lines of the line 302; and also the contact portions 180g and 180h are inserted/connected into/to the respective branched lines of the line 304. With such a connection, as to all of the electric connection lines between the torque sensor 300 and the controller 130, the individual contact portions are inserted into the respective dual portions of the lines.

The controller 130 supplies the power from the power supply Vcc and the ground line GND to the torque sensor 300, and inputs the detection voltages A and B from the torque sensor 300. After the detection voltage A has passed through the dual-processed line 303 within the torque sensor 300 and also the contact portions 180c and 180d of the connector 180 provided in the halfway of the line 303, this detection voltage A is transferred to the single line obtained by combining the branched lines within the controller 130, thereby constituting the detection voltage A'. The line for this detection voltage A' is grounded via the input resistor R1 in view of the noise resisting characteristic. The resistance value Ri of this input resistor R1 is selected to be sufficiently higher than the resistance value of the potentiometer 31 in order not to give any adverse influences to the detection voltage A produced by dividing a voltage by a resistor of the potentiometer 31. The detection voltage B passes through the dual-processed line 304 within the torque sensor 300 and the contact portions 180g and 180h of the connector 180 in the halfway of the dual-process line 304, and thereafter transferred to the single line obtained by combining the branched lines within the controller 130, thereby constituting the detection voltage B'. Due to the same reason for the line of the detection voltage A', the line of this detection voltage B' is grounded via the input resistor R2 having the resistance value Ri. These detection voltages A' and B' are inputted to a torque calculating circuit 131 and an abnormality detecting circuit 135, provided at post stages thereof, as signals indicative of the detected torque.

The torque calculating circuit 131 is constructed by, for instance, an operational amplifier to which both of the detection voltage A' and the detection voltage B' are supplied as the inverting input in the adding manner, and the neutral voltage Vo between the detection voltages A' and B', namely the voltage (Vcc/2) is supplied as the non-inverting input, and also the feedback resistance value of which is so set as to achieve ½ of the inverting amplification. As a consequence, a calculation is made to average the detection voltage A' and B', so that a single torque detection signal T is produced from one pair of the detection voltages A' and B'. The torque detection signal T is outputted to a motor current instructor 132.

Figure 4:
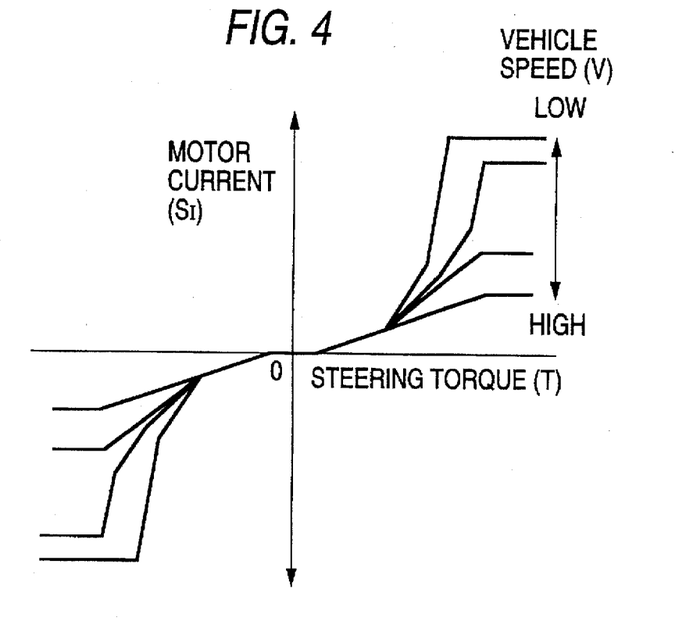
FIG. 4 is a characteristic diagram for indicating a relationship between a current value of a motor and steering torque while using a vehicle speed as a parameter.

The motor current instructor 132 inputs therein not only the torque detection signal T but also the vehicle speed detection signal V, and is constructed by employing, for example, a line function generating circuit and the like, which mainly contains an operational amplifier. The motor current instructor 132 produces a motor current instruction signal $S_I$ for defining the drive current to be supplied to the motor 12. A more concrete explanation will now be made. In FIG. 4, there is shown a characteristic diagram for representing a relationship among the steering torque, the vehicle speed, and the motor current. A target value of the motor current corresponding to the values of the entered torque detection signal T and the vehicle speed detection signal V is calculated in accordance with the function based on the characteristic diagram of FIG. 4, and the calculated motor current target value is outputted as the motor current instruction signal $S_I$. This characteristic diagram indicates the corresponding graphic representation among the motor current, the steering torque, and the vehicle speed. This motor current is required to drive the motor 12 for producing the auxiliary steering force corresponding to the steering torque applied to the steering shaft 2. It is so designed that the lower the speed of the vehicle becomes, the larger the value of the motor current instruction signal $S_I$ becomes. Also, the larger the steering torque becomes, the larger the value of the motor instruction signal $S_I$ becomes, and when the value of the motor instruction signal exceeds a predetermined value, it does not become larger than this predetermined value. The motor current instruction signal $S_I$ is fed to a motor drive circuit 133.

Although the motor drive circuit 133 is not shown in detail in the drawing, this motor drive circuit 133 is constructed by, for instance, an H bridge circuit having four MOS-FETs (field-effect transistors) as switching transistors, a gate drive circuit for driving the gates these transistors; and a PWM circuit for controlling the e drive circuit by a signal with a pulse width corresponding to the motor current instruction signal $S_I$. Furthermore, the H bridge circuit is connected to the power line from the 16 so as to receive the battery power, and an output line is connected to the motor 12 in order to switching-control the motor drive current I. A pulse width modulation (PWM) signal is generated by the PWM circuit in accordance with the of the motor current instruction signal $S_I$. The switching transistors of the H bridge circuit are turned ON/OFF by the gate drive circuit in response to the pulse width modulation signal, and the motor drive current I to the motor 12 is controlled by the switching operations of the H bridge circuit. Accordingly, the motor drive current I is varied in accordance with the motor current instruction signal $S_I$, so that the normal/reverse rotation directions of the motor 12 and the steering auxiliary force generated in the motor 12 are controlled. It should be noted that a PID control be employed so as to increase the follow-up characteristic the motor drive current I in response to the motor current instruction signal $S_I$.

An output stopping circuit 134 is provided between the PWM circuit and the gate drive circuit in the motor drive circuit 133. The output stopping circuit 134 is constructed by, for instance, a gate circuit formed of an AND gate group, into which an inverted signal of the abnormality detection signal SR and the output signal from the PWM circuit are inputted, and whose output is supplied to the gate drive circuit. When the abnormality detection signal $S_R$ is fed, namely the value of the abnormality detection signal $S_R$ becomes an "H" level, the signal supply from the PWM circuit to the gate drive circuit is interrupted. On the other hand, when the abnormality detection signal $S_R$ is not equal to the "H" level, the output signal of the PWM circuit is directly transferred to the gate drive circuit. As a result, when the abnormality detection signal $S_R$ is fed out, all of the switching elements in the H bridge circuit are turned OFF to interrupt the supply of the motor drive current, so that the generation of the steering auxiliary force by the motor 12 is stopped.

The abnormality detecting circuit 135 includes, for example, a differential amplifier which receives detection voltages A' and B' and outputs a difference voltage "ΔV" between these voltages; and a comparator which receives the difference voltage ΔV and a predetermined threshold value $V_{dif}$, compares them, and outputs the abnormality detection signal $S_R$ having the H level when the difference voltage ΔV becomes higher than the threshold value $V_{dif}$. As a result, when the detection voltages A' and B' becomes higher than the threshold value $V_{dif}$, judgement is made of "abnormality". The abnormality detection circuit 135 also includes a comparator for outputting the abnormality detection signal $S_R$ having the H level when the detection voltage A' becomes higher than a preselected threshold value $V_{high}$; another comparator for outputting the abnormality detection signal $S_R$ having the H level when the detection voltage A' becomes lower than a predetermined threshold value $V_{low}$; another comparator for outputting the abnormality detection signal $S_R$ having the high level when the detection voltage B' becomes higher than a preselected threshold value $V_{high}$; and also a further comparator for outputting the abnormality detection signal $S_R$ having the H level when the detection voltage B' becomes lower than the predetermined threshold value $V_{low}$. As a consequence, when any one of the detection voltages A' and B' becomes higher than the threshold value $V_{high}$, or lower than the threshold voltage $V_{low}$, such a judgement is made of "abnormality".

Figure 5:
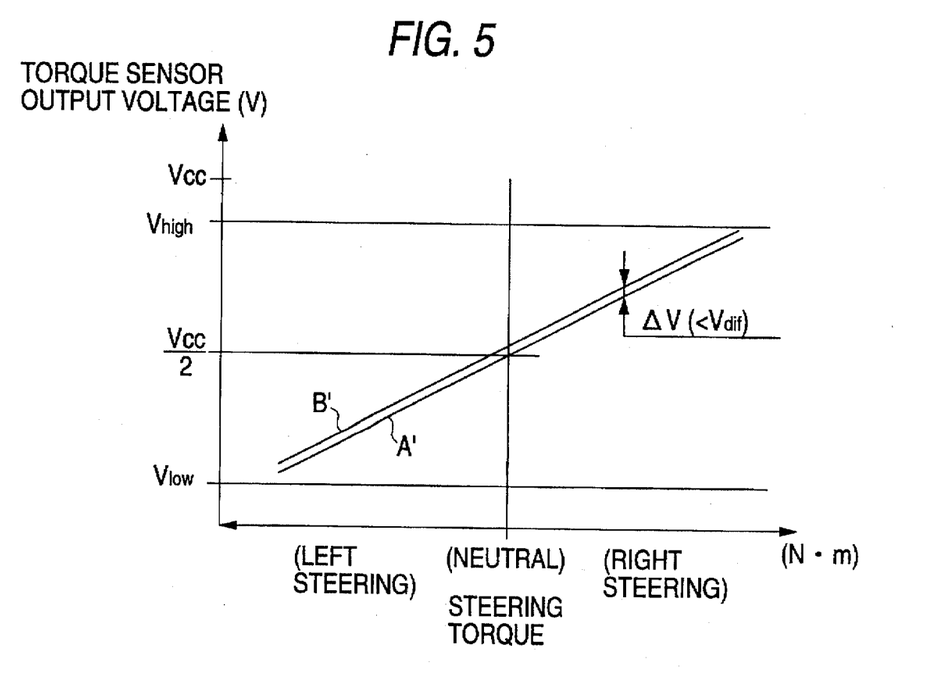
FIG. 5 is a diagram for showing a range where an abnormality is detected with respect to an output voltage of the torque sensor.

As represented in FIG. 5, the respective threshold values $V_{dif}$, $V_{high}$, $V_{low}$ are set based upon the changing ranges of the detection voltages A' and B', while using the detection voltage A' as a reference. In other words, the threshold value $V_{dif}$ is set to a small value, taking account of the deviation between the detection voltage A' and the detection voltage B' caused by the fluctuations in the characteristics of the potentiometers 31 and 32. On the other hands, the threshold value $V_{high}$ is set to such a value which slightly exceeds the upper limit of the changing range of the detection voltages A' and B' under the normal operation of the torque sensor, whereas the threshold value $V_{low}$ is set to such a value which becomes slightly lower than the lower limit of this changing range. Based upon the comparison result with these threshold values, the abnormality detection signal $S_R$ made into the high level by the abnormality detecting circuit 135, is sent to the output stopping circuit 134. As a result, when the abnormality occurred in the torque detection system is detected based on the detection voltages A' and B', the generation of the steering auxiliary force by the motor 12 is stopped. Further, when the abnormality detection signal having the high level is produced, the controller 130 stops the output of a clutch control signal to a clutch controlling circuit 62, so that the clutch 11 is actuated so as to bring the output shaft of the motor 12 and the reduction speed gear 10 into the release condition. Also, based on this manner, such a condition may be avoided that unwanted steering auxiliary force is applied to the steering system when the abnormality is detected.

The operation of the electric power steering apparatus of the first embodiment with the above-described structure, will be described. Concretely, the following descriptions are separated into three cases. That is, there is a case when all of the contact portions 180a to 180h in the connector 180 are normally made contact/conductive, and the contact resistances thereof are negligible. There is another case that the contact portion 180d in the connector 180 has the resistance value $R_L$ of a meaning level, and is made contact/conductive. A further case is such that the contact portion 180d and the contact portion 180e in the connector 180e have the resistance values $R_L$ and $R_4$ of meaning levels, respectively, and are made contact/conductive. It is assumed that the potentiometers 31, 32 and the controller 130 are not in abnormality.

The first case in which all of the contact portions 180a to 180h in the connector 180 are normally made contact/conductive, so that the contact resistance values thereof are negligible, will be described. Since the contact resistance values of the contact portions 180a to 180h in the connector 180 are negligible, the power supply voltage Vcc is applied via the contact portions 180a and 180b to one fixed terminal of each of the potentiometers 31 and 32, whereas the other fixed terminal of each of the potentiometers 31 and 32 is grounded. Assuming now that the steering system is under straight movement condition and the steering torque is equal to zero, both of the variable contacts of the potentiometers 31 and 32 are located at the neutral positions, and both of the detection voltages A and B becomes neutral voltages Vo, namely (Vcc/2). When the driver turns the steering wheel 1 to, for instance, the right direction during the driving operation, if the rotation force is produced in the steering shaft 2 by the operation of the steering wheel 1, then this rotation force is transferred to the steering gear 8 and also to the steered wheel. At this time, since resistance forces are produced in the output shaft 2b of the steering shaft 2, which correspond to the friction force between the steered wheel and the road surface and also the friction force caused by the gear meshes of the rack and pinion, the relative rotations are produced by torsion between the input shaft 2a and the output shaft 2b of the steering shaft 2. Then, the rotators of the potentiometers 31 and 32 coupled to this portion are rotated in conjunction with the relative rotation. Furthermore, the variable contacts are moved by this rotation, so that the detection voltages A and B become higher than the neutral voltage Vo by a voltage corresponding to the steering torque. In any cases, the detection voltages A and B are within the normal changing range, and are substantially identical to each other. In other words, both of the detection voltages A and B exceed the threshold value $V_{low}$, and are below the threshold value $V_{high}$, and a difference between the threshold voltages A and B is below the threshold value $V_{dif}$.

Since the contact resistance values of the contact portions 180a to 180h in the connector 180 are negligible, the detection voltage A derived from the potentiometer 31 is inputted as the detection voltage A' having the same voltage value as that of the detection voltage A via the contact portions 180c and 180d into the controller 130. Similarly, the detection voltage B derived from the potentiometer 32 is inputted as the detection voltage B' having the same voltage value as that of the detection voltage B via the contact portions 180g and 180h to the controller 130. Thus, similar to the detection voltages A and B, both of the detection voltages A' and B' exceed the threshold value $V_{low}$, and are below the threshold value $V_{high}$, and a difference between the detection voltages A' and B' is below the threshold value $V_{dif}$.

The detection voltages A' and B' inputted into the controller 130 are fed to the abnormality detecting circuit 135 and the torque calculating circuit 131. Since the detection voltages A' and B' present within such a range do not correspond to the abnormality detection condition in the abnormality detecting circuit 135, in this case, no abnormality detection signal $S_R$ having the H level is outputted from the abnormality detecting circuit 135. As a consequence, the output stopping operation by the output stopping circuit 134 is not carried out. Thus, an average value of the detection voltages A' and B' is calculated by the torque calculating circuit 131, so that a torque detection signal T is produced. Based on this torque detection signal T and the separately produced vehicle speed detection signal V, the motor current instruction signal $S_I$ is produced by the motor current instructor 132. In response to this motor current instruction signal $S_I$, the motor drive current I is supplied by the motor drive circuit 133. The steering auxiliary force generated by the motor 12 is controlled in such a manner that when the vehicle is driven under straight drive condition and the steering torque is zero, the steering auxiliary force becomes substantially zero, and when the steering torque becomes positive by turning the steering wheel to the right direction, the steering auxiliary force also becomes the positive value corresponding thereto. Accordingly, in this case, namely, in the case that there is no loose contact or no contact failure in the electric connection unit, the overall electric power steering apparatus is brought into the optimum driving condition.

Figure 6:
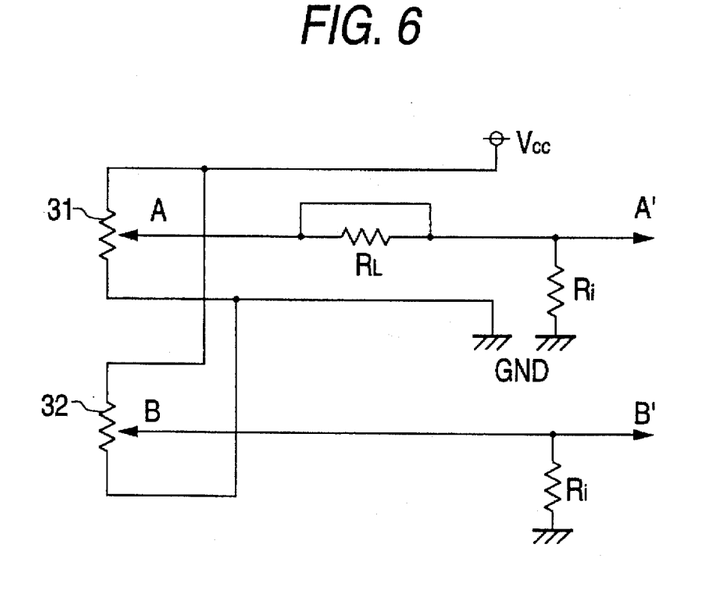
FIG. 6 is an equivalent circuit when a contact failure occurs in one of the dual lines in the electric connection unit.

Next, another case in which the contact portion 180d having the resistance value $R_L$ of a meaning level in the connector 180 is made contact/conductive, so that the contact resistance value thereof is not negligible, will be described. Incidentally, it is assumed that other contact resistances of other contact portions are negligible. In other words, only the contact portion 180d among the contact portions 180c and 180d for connecting the lines of the detection voltage A and the detection voltage A' is brought into the loose contact condition. In this case, FIG. 6 shows an equivalent circuit for mainly indicating the connector 180. There are a resistance value $R_L$ at the relevant position of the contact portion 180d and a conducting line at the relevant position of the contact portion 180c. Thus, both ends of the resistance value $R_L$ are brought into a shortcircuit condition by way of the line connected parallel to this resistance value $R_L$. Accordingly, the detection voltage A generated at the potentiometer 31 in response to the steering torque is inputted as the detection voltage A' having the same voltage value as that of the detection voltage A via the contact portion 180c into the controller 130. The detection voltage B derived from the potentiometer 32 is inputted as the detection voltage B' having the same voltage value as that of the detection voltage B via the contact portions 180g and 180h into the controller 130. Namely, the detection voltages A' and B' are obtained similar to the case where all of the contact portions 180a to 180h in the connector 180 are normally made contact.

As described above, the abnormality detecting circuit 135 outputs no abnormality detection signal $S_R$ having the H level in case of such detection voltages A' and B' so that the output stopping operation by the output stopping circuit 134 is not carried out, the torque detection signal T is generated from the detection voltages A' and B', the motor current instruction signal $S_I$ is produced from this torque detection signal T and the like, and the motor drive current I is supplied in response to this motor current instruction signal $S_I$. As a result, the steering auxiliary force generated at the motor is controlled in accordance with the steering torque. Thus, in this case, namely, when the loose contact happens to occur in one of the dual lines in the electric contact unit, the entire electric power steering apparatus can be maintained under optimum operation condition.

Figure 7:
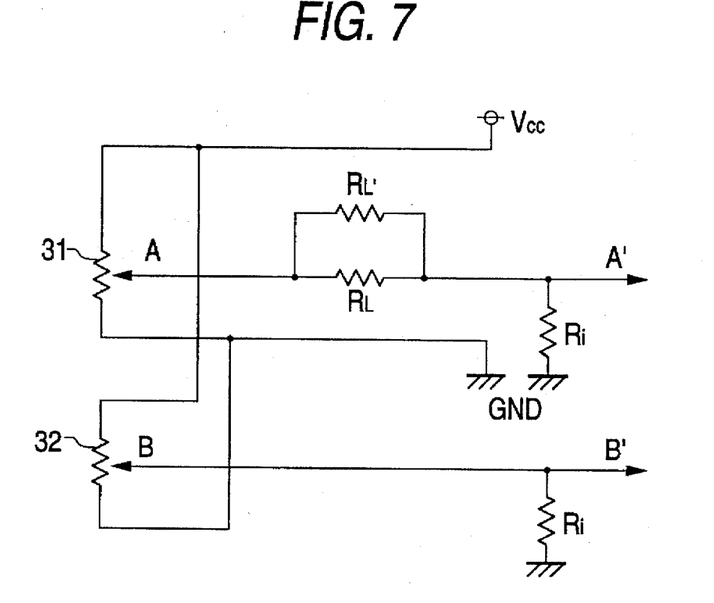
FIG. 7 is an equivalent circuit when contact failures occur in both lines of the dual lines in the electric connection unit.

Finally, a case in which the contact portion 180d and the contact portion 180c having the resistance values $R_L$ and $R_{L'}$ of meaning levels in the connector 180 are made contact/conductive, or are not in contact (in this case, resistance values $R_L$ and $R_{L'}$ become infinite), so that the contact resistance values thereof are not negligible, will be described. It is assumed that the contact resistance values of other contact portions are negligible. In other words, only the contact portion 180c and the contact portion 180d in the connector 180, which connect the lines for the detection voltage A and the detection voltage A', are brought into the loose contact conditions. In this case, FIG. 7 shows an equivalent circuit for mainly indicating the connector 180. There are the resistance value $R_L$ at the corresponding position of the contact portion 180d, and also the resistance value at the corresponding portion of the contact portion 180c. That is, the line for the detection voltage A and the line for the detection voltage A' are brought into the connected condition by parallel connection of the resistance values $R_L$ and $R_{L'}$. That is to say, it is equal to such a condition that a resistor having a resistance value $R_{LL}=(R_L \times R_{L'})/(R_L+R_{L'})$ is interposed between the lines for the detection voltages A and A'. In this case, since the resistance value $R_{LL}$ becomes smaller than the smaller resistance value of any one of the resistance values $R_L$ and $R_{L'}$, even when both of the resistance values $R_{L'}$ and $R_L$ exceed the meaning level, there can be such a case that the resistance value $R_{LL}$ may become lower than the meaning level. In this case, the resistive component existing between the lines for the detection voltages A and A' is negligible. As a consequence, although no detailed explanation is made, the overall electric power steering apparatus can be maintained under the optimum drive condition similar to the above-described case.

To the contrary, when the resistance value $R_{LL}$ is not negligible but becomes large, the detection voltage A produced in the potentiometer 31 in response to the steering torque, is entered via the resistor having the resistance value $R_{LL}$ to the controller 130, and then the detection voltage A' is generated based on the resistor voltage division between the resistor having the resistance value $R_{LL}$ and the input resistor R1. As a consequence, the detection voltage A' becomes a value obtained by multiplying the detection voltage A by $(Ri/(R_{LL}+Ri))$, and therefore is not coincident with the detection voltage A. As a concrete example, when the detection voltage A is equal to the neutral voltage Vo, the detection voltage A' becomes lower than the neutral voltage Vo by the value of $(RLL/(R_{LL}+Ri)) \times Vo$. On the other hand, the detection voltage B derived from the potentiometer 32 is inputted as the detection voltage B' having the same voltage value as that of the detection voltage B via the contact portions 180g and 180h into the controller 130. In other words, when the detection voltages B is equal to the neutral voltage Vo, this detection voltage B' is also equal to this voltage Vo. Accordingly, when either a difference between the detection voltage A' and the detection voltage B', namely $(R_{LL}/(R_{LL}+Ri)) \times VO$ becomes higher than the threshold value $V_{dif}$, or the detection voltage A', namely $(Ri/(R_{LL}+Ri)) \times Vo$ becomes lower than the threshold value $V_{low}$, this condition corresponds to the abnormality detection condition in the abnormality detecting circuit 135. In this case, the abnormality detection signal $S_R$ having the H level is outputted from the abnormality detecting circuit 135. Then, in response to this condition, the output stopping operation is carried out by the output stopping circuit 134. Now, the generation of the steering auxiliary force by the motor 12 is stopped and the fail-safe function is performed. That is, in this case, namely, when both of the dual lines in the electric connection unit are brought into the loose contact conditions, and also the resistance values of the overall parallel resistors are not negligible but large, which corresponds to the abnormality detection condition, the fail-safe function is performed.

When the present condition does not correspond to the abnormality detection condition in the abnormality detecting circuit 135, no abnormality detection signal $S_R$ having the H level is outputted from the abnormality detecting circuit 135 and the output stopping operation by the output stopping circuit 134 is not carried out. The torque detection signal T is produced from the detection voltages A' and B'. However, even when both of the detection voltages A and B are equal to the neutral voltage Vo, the torque detection signal T at this time is not equal to a value under the neutral condition. Concretely, since the detection voltage A' is lower than the neutral voltage Vo by $(R_{LL}/(R_{LL}+Ri)) \times Vo$, the torque detection signal T obtained by averaging the detection voltage A' and the detection voltage B' is equal to a value deviated from the value of the neutral condition by $[(R_{LL}/(R_{LL}+Ri)) \times Vo]/2$. Then, the motor current instruction signal $S_I$ is produced from this torque detection signal T and the like. When the motor drive current I is supplied in response to this motor current instruction signal $S_I$, the steering auxiliary force in the left steering direction is produced by the motor 12. As a result, the steering wheel 1 would be undesirably rotated (self rotation) in the left direction. However, it should be noted that even in such a case, the torque detection signal T is deviated only by $[(R_{LL}/(R_{LL}+Ri)) \times Vo]/2$ from the value under the neutral condition, although the torque detection signal T is deviated by $[(R_{LL}/(R_{LL}+Ri)) \times Vo]/2$ from the value under the neutral condition in the prior art. As previously explained, since $R_L \geq R_{LL}$, this deviation amount is generally smaller than the conventional deviation amount. As a consequence, in this case, namely, when both of the dual lines in the electric connection unit are under loose contact conditions, the overall resistance values of the parallel resistors are not negligible, but are large, and also it does not correspond to the abnormality detection condition, such a disadvantage similar to that of the prior art is produced. However, in general, the degree of the disadvantage in the present invention is not serious.

As apparent from the foregoing explanations, even when the loose contact happens to occur in the electric connection unit, if the loose contact occurs in only one of the dual lines in the electric connection unit, there is no inconvenience in the overall apparatus. Only the problem occurs when the loose contact occurs in both of the dual lines in the electric connection unit. Thus, assuming that an occurrence ratio of the loose contact in the contact portion when the lines between the torque sensor and the control apparatus are not made in the dual system is F1, an occurrence ratio of the loose contact in the connection portion when the lines between the torque sensor and the control apparatus are made in the dual system becomes F1×F1. Normally, since F1 is equal to a rather smaller value than "1.0", F1×F1 becomes a very small value. As a consequence, in accordance with the electric power steering apparatus of the present invention, the abnormality ratio of the overall apparatus caused by the loose contact occurred in the electric connection unit between the torque sensor and the control apparatus become low, and the reliability as well as the working efficiency become high.

Electric power steering apparatuses according to a second embodiment through a fifth embodiment of the present invention will be described. Since these embodiments correspond to modifications of the above-explained first embodiment, the main portions, that is, circuit portions mainly in electric connection units between torque sensors and control apparatuses, are shown in FIG. 8 to FIG. 11, and only different points will be explained in the following.

Figure 8:
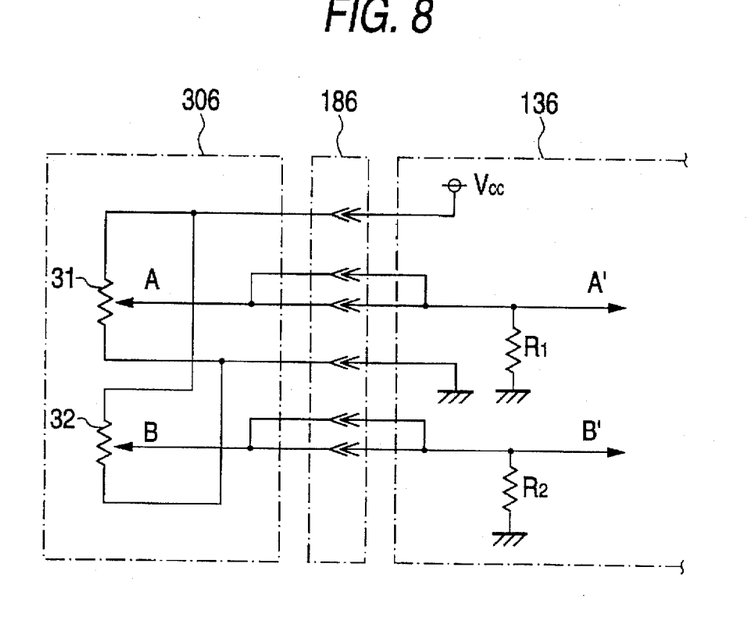
FIG. 8 is a diagram for showing a major portion of a second embodiment of the present invention.

FIG. 8 shows the second embodiment in which only a portion of connection lines between a torque sensor 306 and a controller 136 is made of dual lines. Concretely, although the lines for the detection voltages A and B with very small currents are made in the dual system, the power supply line Vcc and the ground line GND with larger currents than the above-described currents are not made in the dual system. Since a portion of the electric connection unit is selectively made in the dual system, it is possible to solve the tradeoff between improvements in reliability and increases in cost due to the required numbers of lines and terminals of a connector 186.

Figure 9:
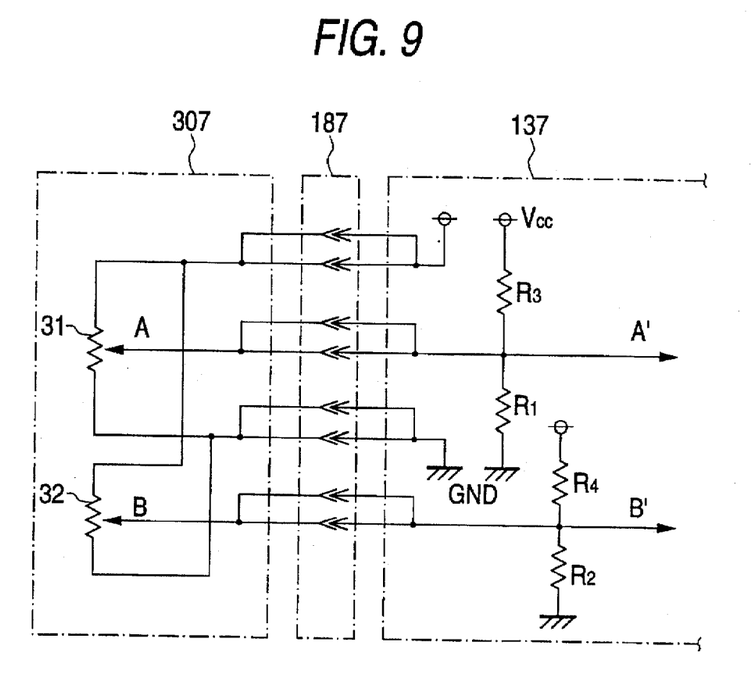
FIG. 9 is a diagram for showing a major portion of a third embodiment of the present invention.

In the third embodiment shown in FIG. 9, both of a torque sensor 307 and a connector 187 are identical to the torque sensor 300 and the connector 180 in the first embodiment. However, as to the controller 137, the line for the detection voltage A' is grounded via an input resistor R1 and is connected also via another input resistor R3 to the power supply line Vcc, whereas the line for the detection voltage B' is grounded via an input resistor R2 and also is connected via another input resistor R4 to the power supply line Vcc. As a consequence, it is possible to prevent or reduce the following problem. That is, when contact failures happen to occur in both of the dual lines in the connector 187, the detection voltage A' is deviated to the ground side without any condition.

Figure 10:
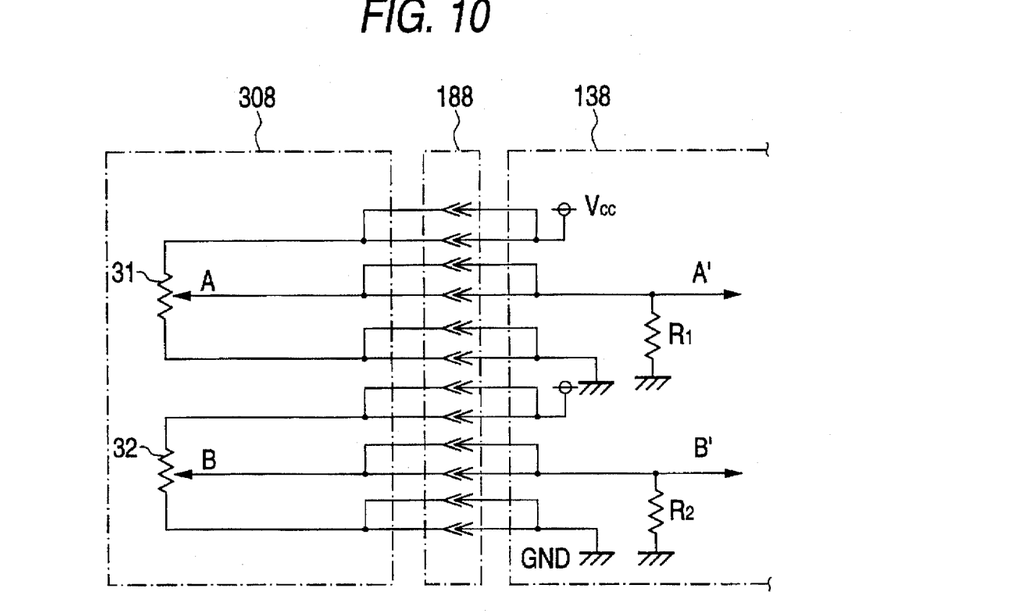
FIG. 10 is a diagram for showing a major portion of a fourth embodiment of the present invention.
Figure 11:
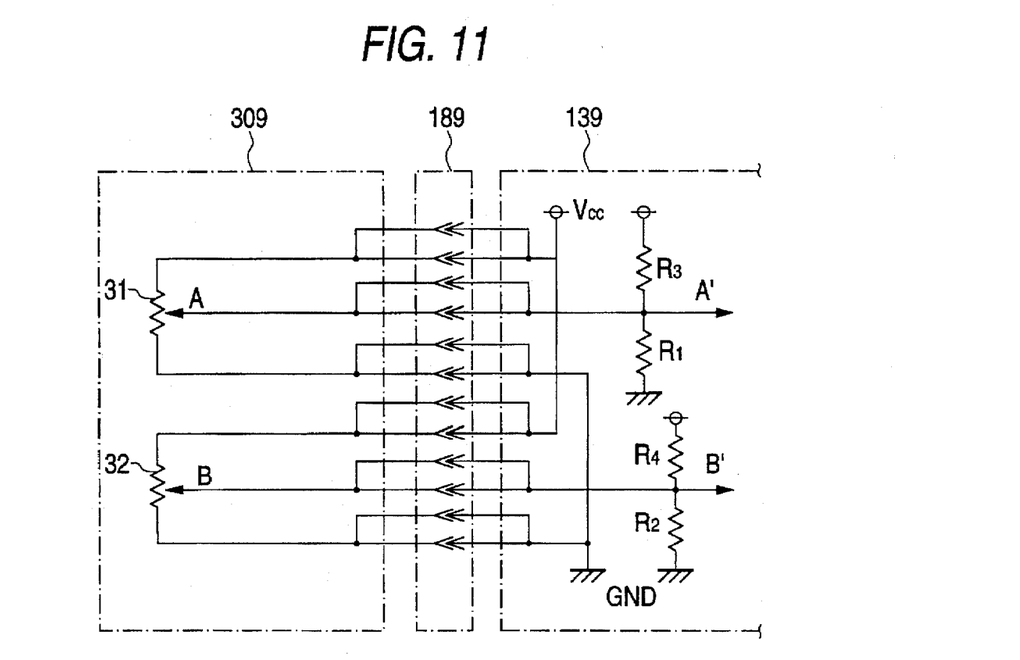
FIG. 11 is a diagram for showing a major portion of a fifth embodiment of the present invention.

In the fourth embodiment shown in FIG. 10 and the fifth embodiment shown in FIG. 11, a power supply line and a ground line for the potentiometers 31 and 32 are separately provided and are made in a dual system with respect to the first embodiment of FIG. 3 and the fourth embodiment of FIG. 9. As a result, reliability of the power supply voltage and the ground voltage applied to the potentiometers 31 and 32 is further improved.

It should be noted that although the above-described embodiments have been explained when the right steering operation is performed, a similar effect may be achieved even when the left steering operation is carried.

Also, when the lines are made in the dual system, the lines are branched within the torque sensor and the controller in the above-described embodiments. Alternatively, the lines are not branched within the torque sensor and the controller, but the lines may be branched at the connector terminal connection portion so as to make the dual lines. Furthermore, although the lines have been made in the dual system, the present invention is not limited only to such a dual line system, but may be applied to such a case that more than two lines are connected in parallel to each other.

The above-described embodiments have been made of such a case that the lines between the torque sensor and the controller are made in the dual mode in the electric power steering apparatus whose torque detection system is the dual system. The present invention is not limited to the case that the torque detection system is made in the dual system. Alternatively, the torque detection system may be realized as triple, or more higher multiple system. Conversely, the torque detection system may not be made in the multiple system.

The above-described embodiments have been made of such examples that the torque sensors arranged by the potentiometers having the rotators. The potentiometer of the torque sensor may be made by a potentiometer which has no rotator and a variable contact of which is directly slid in response to deviation of a steering shaft. Furthermore, the torque sensor may be made by other deviation sensors, or a torque sensor containing a signal amplifying circuit such as an amplifier. For instance, it is possible to employ such a torque sensor having a coil whose inductance is varied in response to torque, and sensing the torque by a voltage induced from the coil.

The input circuit employed in the control apparatus is not limited to such an input circuit which is merely terminated by the input resistor, but may be additionally provided with a noise removing filter circuit.

The lines connected to both of the fixed terminals of the potentiometer are not limited to the power supply line and the ground line, but may be realized by other reference voltage lines.

The connector need not be provided in a halfway of the cable for connecting the torque sensor and the control apparatus. Alternatively, the male portion or the female portion of the connector may be assembled in the control apparatus in one body, or may be assemble in the torque sensor.

The contact component is not limited to the connector, but may be realized by a so-called "pin-jack type connector".

The torque detection signal has been produced by averaging the detection voltages A' and B', but is not limited thereto. Alternatively, the detection voltage A' may be used as the torque detection signal, and the detection voltage B' may be used so as to monitor the detection voltage A'.

Although the cable has been employed so as to electrically connect the torque sensor with the controller in the above-described embodiments, wire harnesses independently employed may be utilized.

In the above-described embodiments, the drive control of the motor has been carried out based on the PID control. Alternatively, the drive control of the motor may be performed based upon the PI control and the like.

In the above-described embodiment, it has been described that the motor control instruction value is set based on the steering torque and the vehicle seed. Alternatively, the motor control instruction value may be set based upon only the steering torque.

Also, in the above-explained embodiments, it has been described that the control apparatus is directly arranged by the electronic circuit. The functions of the motor current instructor and the abnormality detecting circuit may be realized by a microcomputer and a program executed by the microcomputer.

In the above-described embodiment, the motor drive circuit has been constructed by the FETs (field-effect transistors). Alternatively, this motor drive circuit may be constructed by employing other switching elements such as bipolar transistors.

As described above, either a portion of the electric connection unit between the steering torque detector and the control apparatus, or all portions thereof are made in the dual system in the power steering apparatus of the present invention, so that the disadvantage caused by the loose contact of the electric connection unit can be eliminated or reduced.

As a consequence, it is possible to provide the electric power steering apparatus with high reliability and high working efficiency.

What is claimed is:

1. An electric power steering apparatus, comprising:

a steering torque detector for detecting a steering torque of a steering system;

an electric motor for generating a steering auxiliary force to the steering system;

a control apparatus for controlling the steering auxiliary force generated by said electric motor in response to the steering torque detected by said steering torque detector;

first lines for electrically connecting said steering torque detector to said control apparatus, at least one of said first lines being connected to a second line in parallel; and a contact part having detachable contact portions separately disposed in each of said first lines and said second line, said detachable contact portion disposed in said one of said first lines being positioned between two points where said one of said first lines is connected to said second line.

2. An electric power steering apparatus as claimed in claim 1, wherein said one of said first lines is designed to transmit a detection signal produced by said steering torque detector.

3. An electric power steering apparatus as claimed in claim 2, wherein said one of said first lines is grounded through a first resistor and is also connected to a power supply line through a second resistor in said control apparatus.

* * * * *